United States Patent
Syvänne et al.

(10) Patent No.: US 11,888,818 B2
(45) Date of Patent: Jan. 30, 2024

(54) MULTI-ACCESS INTERFACE FOR INTERNET PROTOCOL SECURITY

(71) Applicant: Forcepoint LLC, Austin, TX (US)

(72) Inventors: Tuomo Syvänne, Helsinki (FI); Juha Luoma, Helsinki (FI); Ville Mattila, Helsinki (FI)

(73) Assignee: Forcepoint LLC, Austin, TX (US)

( * ) Notice: Subject to any disclaimer, the term of this patent is extended or adjusted under 35 U.S.C. 154(b) by 71 days.

(21) Appl. No.: 17/322,264

(22) Filed: May 17, 2021

(65) Prior Publication Data

US 2021/0273915 A1    Sep. 2, 2021

Related U.S. Application Data

(62) Division of application No. 15/897,515, filed on Feb. 15, 2018, now Pat. No. 11,012,418.

(51) Int. Cl.
| | |
|---|---|
| *H04L 9/40* | (2022.01) |
| *H04L 45/30* | (2022.01) |
| *H04L 45/02* | (2022.01) |

(52) U.S. Cl.
CPC ........ *H04L 63/0272* (2013.01); *H04L 63/029* (2013.01); *H04L 63/20* (2013.01); *H04L 45/02* (2013.01); *H04L 45/30* (2013.01)

(58) Field of Classification Search
CPC .... H04L 63/0272; H04L 63/029; H04L 63/20
See application file for complete search history.

(56) References Cited

U.S. PATENT DOCUMENTS

| 7,779,461 | B1 * | 8/2010 | Liu ........................ H04L 9/40 713/153 |
| 7,848,335 | B1 * | 12/2010 | Kang .................. H04L 63/0272 370/409 |
| 7,889,655 | B2 | 2/2011 | Retana et al. |
| 7,899,928 | B1 | 3/2011 | Naik et al. |

(Continued)

OTHER PUBLICATIONS

Jun, Sang-Woo, et al. "Scalable multi-access flash store for big data analytics." Proceedings of the 2014 ACM/SIGDA international symposium on Field-programmable gate arrays. 2014. pp. 55-64. (Year: 2014).*

(Continued)

*Primary Examiner* — Kari L Schmidt
(74) *Attorney, Agent, or Firm* — Jackson Walker L.L.P.

(57) ABSTRACT

A method may include providing a multi-access interface for network traffic, comprising: receiving information regarding topology of a virtual private network and storing the topology in the form of a routing table. A method may include providing an interface for network traffic, comprising: in a virtual private network comprising a plurality of tunnels delivering only information associated with OSI Level 3, receiving a network communication and performing multicast forwarding among the plurality of tunnels using multicast forwarding from OSI Level 2. A method may include providing an interface for network traffic, comprising, in a virtual private network: establishing a connection between a first node of the virtual private network and a second node serving as a virtual private network broker and fetching, by the first node from the virtual private network broker, information regarding one or more other nodes of the virtual private network.

9 Claims, 3 Drawing Sheets

(56) References Cited

U.S. PATENT DOCUMENTS

| | | | |
|---|---|---|---|
| 7,924,837 B1 | 4/2011 | Shabtay et al. | |
| 8,155,125 B1 | 4/2012 | Borgione et al. | |
| 8,310,957 B1 | 11/2012 | Rekhter | |
| 8,918,631 B1* | 12/2014 | Kumar | H04L 63/00 370/254 |
| 9,036,504 B1* | 5/2015 | Miller | H04L 41/0895 370/254 |
| 9,270,585 B2* | 2/2016 | Manion | H04L 45/54 |
| 9,374,270 B2 | 6/2016 | Nakil et al. | |
| 9,596,181 B1* | 3/2017 | Goel | H04L 45/7453 |
| 9,667,431 B2 | 5/2017 | Pani | |
| 9,825,822 B1 | 11/2017 | Holland | |
| 9,979,605 B2* | 5/2018 | Sinn | H04L 45/586 |
| 10,275,416 B1 | 4/2019 | Felbinger et al. | |
| 10,764,249 B1* | 9/2020 | Kommula | H04L 63/0272 |
| 10,834,053 B1* | 11/2020 | Harel | H04L 63/20 |
| 11,190,491 B1* | 11/2021 | Kaciulis | H04L 63/029 |
| 11,240,063 B2* | 2/2022 | Liu | H04L 41/12 |
| 11,546,245 B2* | 1/2023 | Pande | H04L 12/4633 |
| 2003/0037042 A1* | 2/2003 | Kametani | H04L 45/54 707/E17.037 |
| 2003/0147403 A1* | 8/2003 | Border | H04L 63/0209 370/395.52 |
| 2005/0071681 A1* | 3/2005 | Benjamin | H04L 41/0233 726/4 |
| 2005/0163146 A1 | 7/2005 | Ota et al. | |
| 2005/0169270 A1 | 8/2005 | Mutou et al. | |
| 2005/0213574 A1* | 9/2005 | Yoshimura | H04L 45/00 370/389 |
| 2005/0265308 A1* | 12/2005 | Barbir | H04L 12/4641 370/351 |
| 2006/0068785 A1* | 3/2006 | Kamijo | H04W 12/06 455/411 |
| 2006/0133390 A1* | 6/2006 | Sreekantiah | H04L 45/04 370/401 |
| 2006/0146730 A1 | 7/2006 | Zeng et al. | |
| 2006/0187950 A1 | 8/2006 | Bou-Diab et al. | |
| 2006/0203819 A1 | 9/2006 | Farinacci et al. | |
| 2007/0064673 A1 | 3/2007 | Bhandaru et al. | |
| 2007/0204339 A1 | 8/2007 | Bou-Diab | |
| 2007/0253432 A1 | 11/2007 | Regale et al. | |
| 2008/0080509 A1* | 4/2008 | Khanna | H04L 63/0272 370/392 |
| 2008/0101350 A1 | 5/2008 | Kreuk | |
| 2008/0183853 A1 | 7/2008 | Manion et al. | |
| 2009/0037607 A1 | 2/2009 | Farinacci et al. | |
| 2009/0129383 A1 | 5/2009 | Maalouf et al. | |
| 2009/0175194 A1* | 7/2009 | Akhter | H04L 63/164 370/254 |
| 2010/0046531 A1* | 2/2010 | Louati | H04L 41/5054 370/401 |
| 2010/0118882 A1 | 5/2010 | Gao et al. | |
| 2011/0087774 A1* | 4/2011 | Pope | G06F 9/4856 709/224 |
| 2012/0099420 A1* | 4/2012 | Dharwadkar | H04L 12/4641 370/248 |
| 2012/0201539 A1 | 8/2012 | Boertjes et al. | |
| 2012/0294309 A1* | 11/2012 | Cai | H04L 45/745 370/390 |
| 2012/0314618 A1* | 12/2012 | Ben-Houidi | H04L 45/00 370/254 |
| 2013/0182651 A1* | 7/2013 | Kelkar | H04L 61/5038 370/329 |
| 2013/0208718 A1 | 8/2013 | Ashwood-Smith | |
| 2013/0329727 A1 | 12/2013 | Rajagopalan et al. | |
| 2014/0348022 A1 | 11/2014 | Jain | |
| 2015/0098466 A1 | 4/2015 | Haramaty et al. | |
| 2015/0172165 A1 | 6/2015 | Tessmer et al. | |
| 2016/0261506 A1* | 9/2016 | Hegde | H04L 45/025 |
| 2016/0277210 A1 | 9/2016 | Lin et al. | |
| 2017/0070428 A1 | 3/2017 | Ng et al. | |
| 2017/0070474 A1 | 3/2017 | Haramaty et al. | |
| 2017/0171056 A1 | 6/2017 | Dong et al. | |
| 2017/0187624 A1* | 6/2017 | Goel | H04L 45/7453 |
| 2017/0346686 A1 | 11/2017 | Mudigonda | |
| 2017/0346727 A1* | 11/2017 | Perrett | H04L 45/021 |
| 2018/0227195 A1 | 8/2018 | Dumitriu et al. | |
| 2018/0241669 A1 | 8/2018 | Muscariello et al. | |
| 2019/0013966 A1 | 1/2019 | Nagarajan et al. | |
| 2019/0229937 A1 | 7/2019 | Nagarajan et al. | |
| 2019/0372938 A1 | 12/2019 | Pasdar | |
| 2020/0389469 A1 | 12/2020 | Litichever et al. | |
| 2021/0036887 A1* | 2/2021 | Meng | H04L 45/22 |
| 2023/0254287 A1* | 8/2023 | Belleau | H04L 63/029 726/15 |

OTHER PUBLICATIONS

S. D. A. Shah, M. A. Gregory and S. Li, "Cloud-Native Network Slicing Using Software Defined Networking Based Multi-Access Edge Computing: A Survey," in IEEE Access, vol. 9, pp. 10903-10924, 2021. (Year: 2021).*

C. M. Ramya, M. Shanmugaraj and R. Prabakaran, "Study on ZigBee technology," 2011 3rd International Conference on Electronics Computer Technology, Kanyakumari, India, 2011, pp. 297-301. (Year: 2011).*

Sathyanarayan, Auto Discovery VPN Protocol, https://datatracker.ietf.org/doc/draft-sathyanarayan-ipsecme-advpn.

Auto-Discovery VPN Problem Statement and Requirements, Internet Engineering Task Force, RFC 7018, https://tools.ietf.org/html/rfc7018.

Virtual extensible Local Area Network (VXLAN): A Framework for Overlaying Virtualized Layer 2 Networks over Layer 3 Networks, RVC 7348, https://tools.ietf.org/html/rfc7348#section-4.2.

Theodorou, Dimitrios, et al. "NRS: a system for automated network virtualization in iaas cloud infrastructures." Proceedings of the 7th international workshop on Virtualization technologies in distributed computing. 2013, pp. 25-32.

D. Allan, P. Ashwood-Smith, N. Bragg and D. Fedyk, "Provider link state bridging," in IEEE Communications Magazine, vol. 46, No. 9, pp. 110-117, Sep. 2008.

* cited by examiner

MULTI-ACCESS INTERFACE FOR INTERNET PROTOCOL SECURITY

RELATED APPLICATION

This application is a divisional of U.S. patent application Ser. No. 15/897,515, filed Feb. 15, 2018, which is incorporated by reference herein in its entirety.

FIELD OF DISCLOSURE

The present invention relates in general to the field of computers and similar technologies, and in particular to software utilized in this field. Still more particularly, it relates to a method, system and computer-usable medium for providing a multi-access interface for Internet Protocol Security, in order to improve network security and efficiency.

BACKGROUND

Many existing network firewalls and gateways are capable of implementing multilink topologies and Virtual Private Network (VPN) technologies, thus allowing for secure connectivity between two endpoints. Security between two endpoints may be provided by Internet Protocol Security (IPsec), a network protocol suite that authenticates and encrypts the packets of data transmitted over a network. IPsec includes protocols for establishing mutual authentication between agents at the beginning of the session and negotiation of cryptographic keys to use during the session. IPsec can protect data flows between a pair of hosts (host-to-host), between a pair of security gateways (network-to-network), or between a security gateway and a host (network-to-host). IPsec uses cryptographic security services to protect communications over Internet Protocol (IP) networks. IPsec supports network-level peer authentication, data-origin authentication, data integrity, data confidentiality (encryption), and replay protection.

IPsec is an end-to-end security scheme operating in the Internet Layer of the Internet Protocol Suite (analogous to Layer 3 or the network layer in the Open Systems Interconnection (OSI) protocol stack), while some other Internet security systems in widespread use, such as Transport Layer Security (TLS) and Secure Shell (SSH), operate in the upper layers at the Transport Layer (TLS) and the Application layer (SSH). IPsec can automatically secure applications at the IP layer.

As discussed in Internet Engineering Task Force (IETF) Request for Comments (RFC) 7018, which is incorporated herein by reference, it is known that existing approaches to network implementations suffer from a problem of enabling a large number of systems to communicate directly using IPsec to protect traffic communicated between them.

SUMMARY

In accordance with the teachings of the present disclosure, certain disadvantages and problems associated with existing approaches to network implementation have been reduced or eliminated.

In accordance with embodiments of the present disclosure, a method may include receiving information regarding topology of a virtual private network and storing the topology in the form of a routing table.

In accordance with these and other embodiments of the present disclosure, a method may include, in a virtual private network comprising a plurality of tunnels delivering only information associated with Open Systems Interconnect stack Level 3, receiving a network communication, and performing multicast forwarding among the plurality of tunnels using multicast forwarding from Open Systems Interconnect stack Level 2.

In accordance with these and other embodiments of the present disclosure, a method may include, in a virtual private network, establishing a connection between a first node of the virtual private network and a second node serving as a virtual private network broker and fetching, by the first node from the virtual private network broker, information regarding one or more other nodes of the virtual private network.

Technical advantages of the present disclosure may be readily apparent to one having ordinary skill in the art from the figures, description and claims included herein. The objects and advantages of the embodiments will be realized and achieved at least by the elements, features, and combinations particularly pointed out in the claims.

It is to be understood that both the foregoing general description and the following detailed description are explanatory examples and are not restrictive of the claims set forth in this disclosure.

BRIEF DESCRIPTION OF THE DRAWINGS

A more complete understanding of the example, present embodiments and certain advantages thereof may be acquired by referring to the following description taken in conjunction with the accompanying drawings, in which like reference numbers indicate like features, and wherein.

DETAILED DESCRIPTION

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a mobile device such as a tablet or smartphone, a consumer electronic device, a connected "smart device," a network appliance, a network storage device, a network gateway device, a server or collection of servers or any other suitable device and may vary in size, shape, performance, functionality, and price. The information handling system may include volatile and/or non-volatile memory, and one or more processing resources such as a central processing unit (CPU) or hardware or software control logic. Additional components of the information handling system may include one or more storage systems, one or more wired or wireless interfaces for communicating with other networked devices, external devices, and various input and output (I/O) devices, such as a keyboard, a mouse, a microphone, speakers, a track pad, a touchscreen and a display device (including a touch sensitive display device). The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or solid state drive), a sequential access storage device (e.g., a tape disk drive), optical storage device, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

Figure 1:
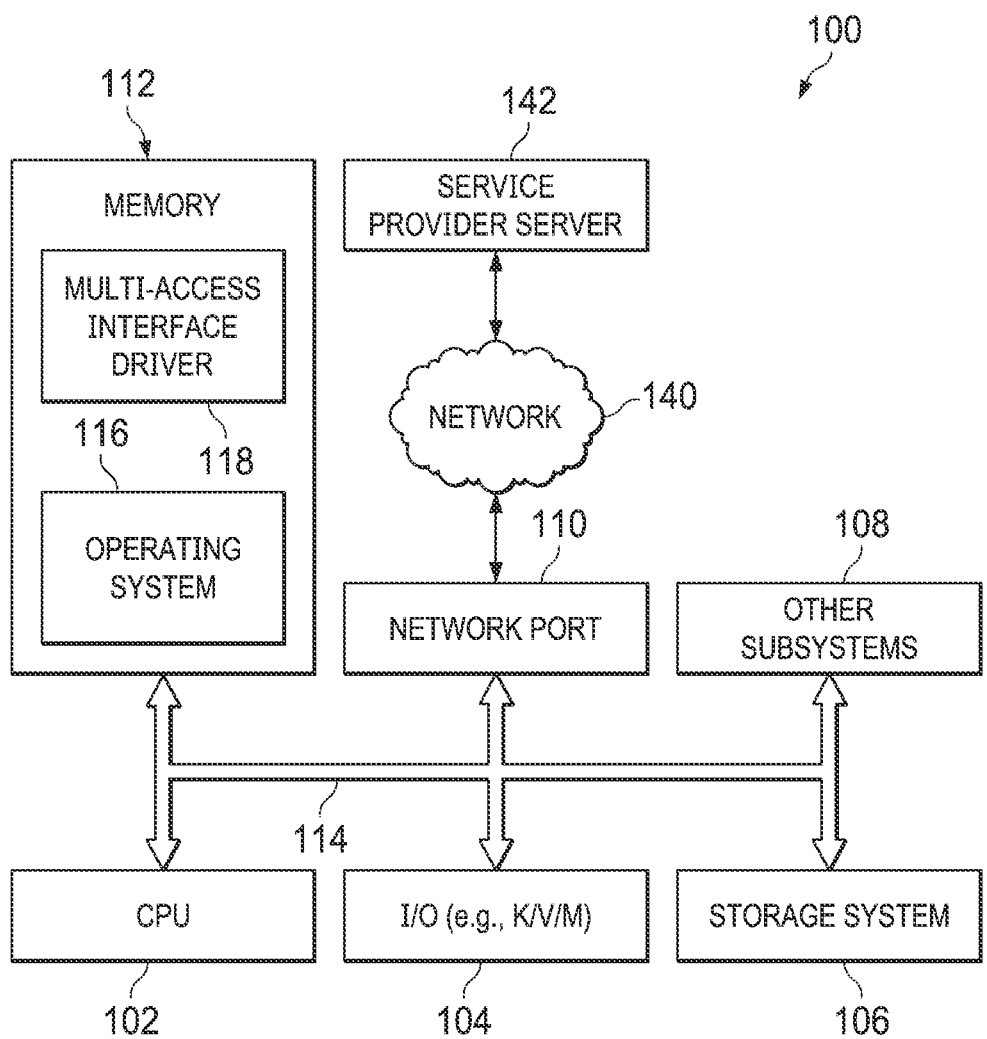
FIG. 1 illustrates an example information handling system in which the methods and systems disclosed herein may be implemented, in accordance with embodiments of the present disclosure.

FIG. 1 illustrates an example information handling system 100 in which the methods and systems disclosed herein may be implemented, in accordance with embodiments of the present disclosure. Information handling system 100 may include a processor (e.g., central processor unit or "CPU") 102, input/output (I/O) devices 104 (e.g., a display, a keyboard, a mouse, and/or associated controllers), a storage system 106, and various other subsystems 108. In various embodiments, information handling system 100 may also include network port 110 operable to couple to a network 140, which may likewise be accessible by a service provider server 142. Information handling system 100 may also include system memory 112, which may be coupled to the foregoing via one or more buses 114. System memory 112 may store operating system (OS) 116 and in various embodiments may also include a multi-access interface driver 118. In some embodiments, information handling system 100 may be able to download multi-access interface driver 118 from service provider server 142. In other embodiments, multi-access interface driver 118 may be provided as a service from the service provider server 142.

In various embodiments, multi-access interface driver 118 may perform operations relating to provision of a multi-access interface of network communications between two endpoint devices of a network, between two gateway devices of a network, or between a gateway device and an endpoint device of a network, as described in greater detail elsewhere in this disclosure. In some embodiments, multi-access interface driver 118 and the functionality thereof improves processor efficiency, and thus the efficiency of information handling system 100, by enabling and providing a multi-access interface with decreased processing resources as compared to existing approaches for communicating information over a network. In these and other embodiments, multi-access interface driver 118 and the functionality thereof may improve an efficiency (e.g., increase throughput, decrease latency), and thus the effectiveness of information handling system 100, by enabling network communication between endpoints and/or gateways with greater effectiveness than existing approaches for network communication. As will be appreciated, once information handling system 100 is configured to perform the functionality of multi-access interface driver 118, information handling system 100 becomes a specialized computing device specifically configured to perform the functionality of multi-access interface driver 118 and is not a general purpose computing device. Moreover, the implementation of functionality of multi-access interface driver 118 on information handling system 100 improves the functionality of information handling system 100 and provides a useful and concrete result of improving network communications by enabling a multi-access interface for IPsec.

Figure 2:
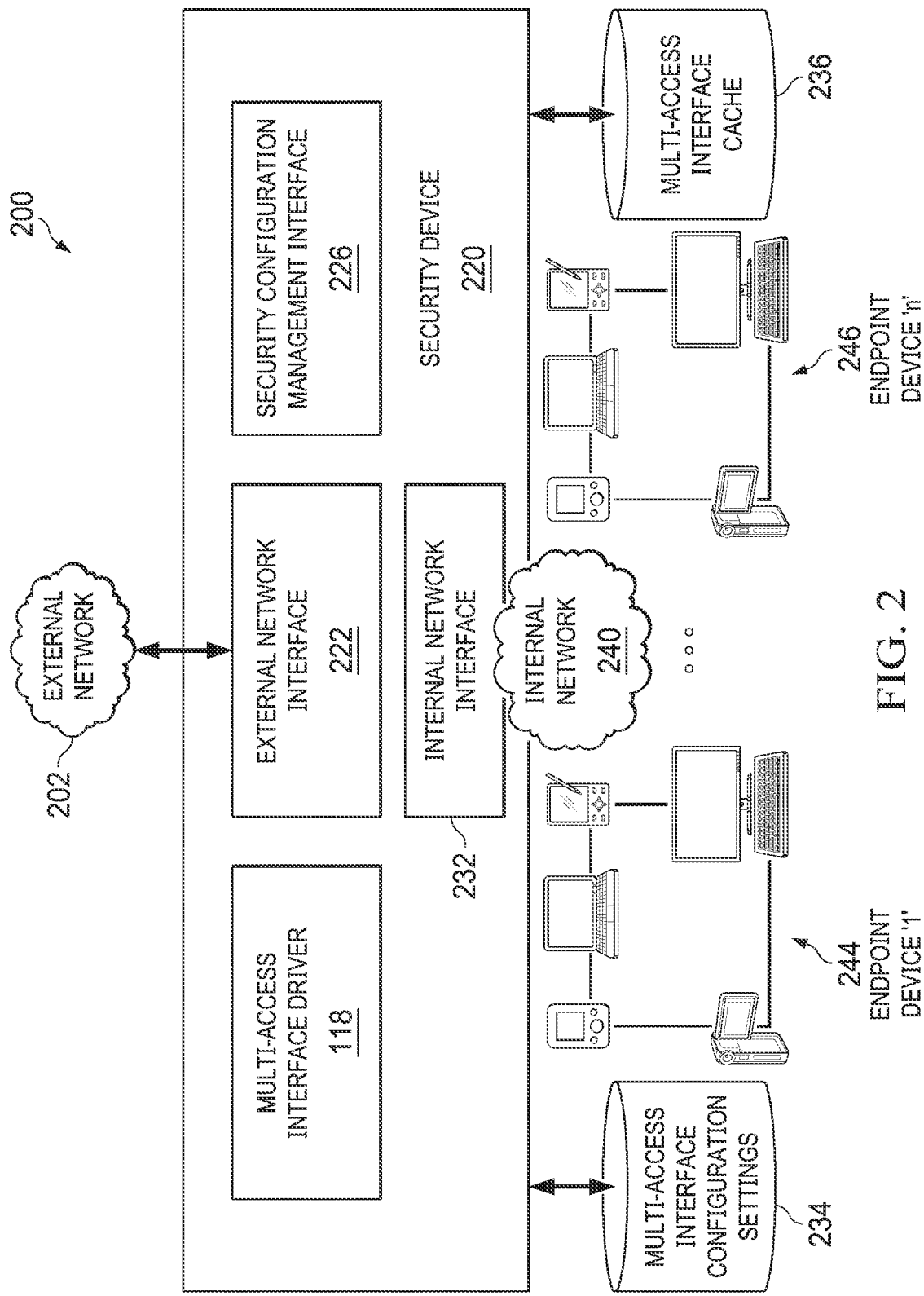
FIG. 2 illustrates a block diagram of a system for providing multi-access interface for IPsec, in accordance with embodiments of the present disclosure.

FIG. 2 illustrates a block diagram of a system 200 for providing a multi-access interface for IPsec, in accordance with embodiments of the present disclosure. In some embodiments, a security device 220 may include an external network interface 222, a security configuration management interface 226, and a multi-access interface driver 118. Security device 220 may be implemented using any suitable information handling system 100, including without limitation a firewall, an intrusion prevention system, an intrusion detection system, or any other suitable security device capable of implementing multi-access interface driver 118. In some embodiments, security device 220 may be implemented as an individual security device 220, a virtual context security device 220, or a security device 220 cluster.

Security device 220 may also include in some embodiments a repository of configuration settings 234 and a multi-access interface cache 236. In some embodiments, security configuration management interface 226 may be implemented to receive deep packet inspection configuration instructions from multi-access interface driver 118.

Security device 220 may also include in some embodiments a repository of multi-access interface configuration settings 234 and a multi-access interface cache 236. In some embodiments, security configuration management interface 226 may be implemented to receive multi-access interface configuration instructions from multi-access interface driver 118.

Skilled practitioners of the art will be familiar with multicast, which is commonly used in a network environment for simultaneously providing Internet Protocol (IP) datagrams, or packets, to a target group of recipient network addresses in real-time or near real-time. In some embodiments, the target group recipient network addresses may be respectively associated with a corresponding endpoint device '1' 244 through 'n' 246. As used herein, an endpoint device refers to an information processing system such as a personal computer, a laptop computer, a tablet computer, a personal digital assistant (PDA), a smart phone, a mobile telephone, a digital camera, a video camera, or other device capable of storing, processing and communicating data via a network, such as an internal network 240. In various embodiments, the communication of the data may take place in real-time or near-real-time.

Embodiments of the invention may reflect an appreciation that network communication may represent an efficient means for communicating useful information. However, those of skill in the art will likewise appreciate that existing technologies do not provide full saturation of WAN links for communication of network traffic between endpoints. Those of skill in the art may appreciate that traditional approaches to WAN communication allow for accurate communication, but with undesirable throughput and latency.

Figure 3:
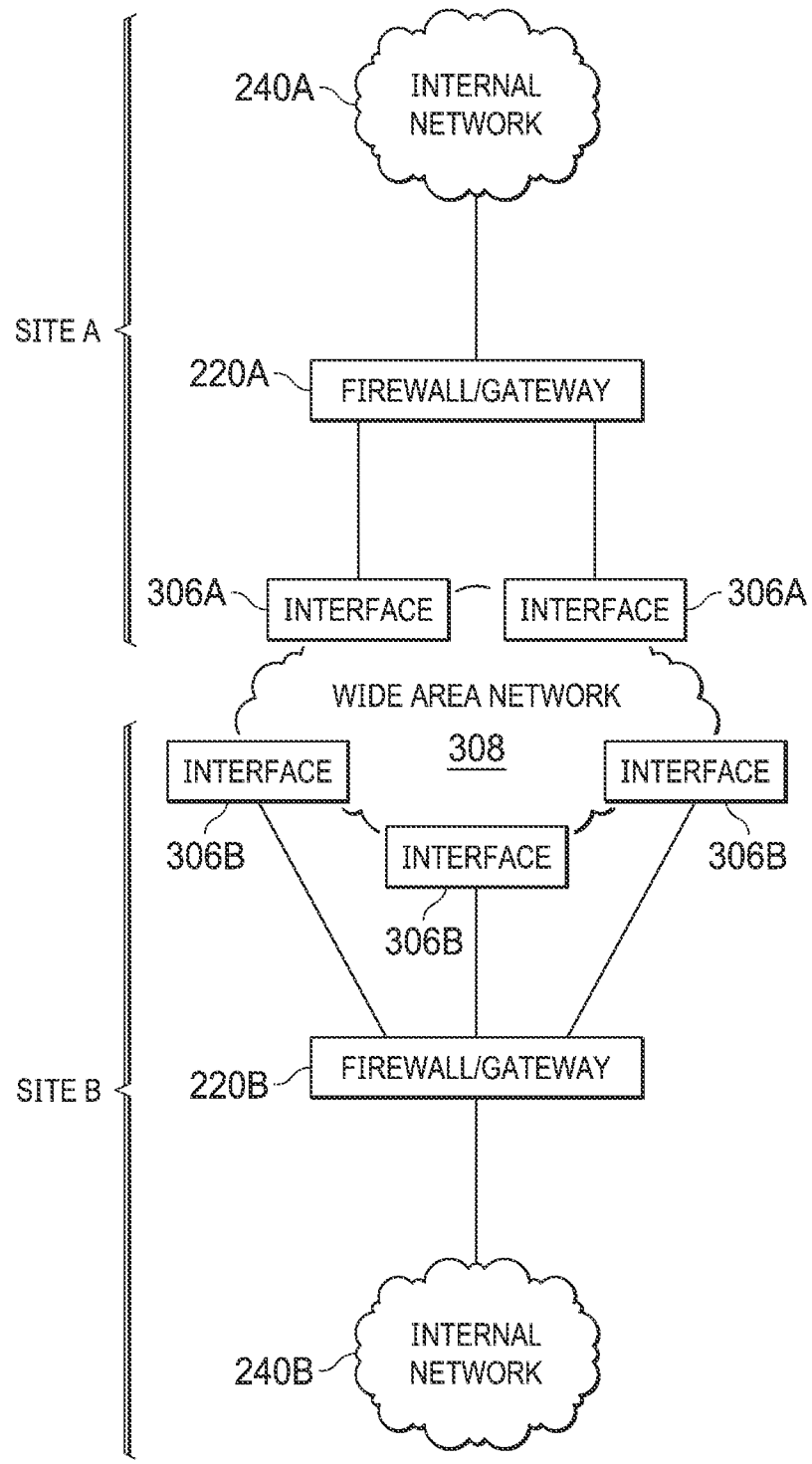
FIG. 3 illustrates a block diagram of an example network in which a VPN may be implemented, in accordance with embodiments of the present disclosure.

FIG. 3 illustrates a block diagram of an example network 300 in which a VPN may be implemented, in accordance with embodiments of the present disclosure. As shown in FIG. 3, network 300 may include a first site labeled as site A that may include internal network 240A, a firewall/gateway 220A, and one or more interfaces 306A. Network 300 may similarly include a second site labeled as site B that may include internal network 240B, a firewall/gateway 220B, and one or more interfaces 306B. Interfaces 306A may be coupled to interfaces 306B via a WAN 308. In some embodiments, WAN 308 may comprise the Internet and interfaces 306A and 306B may comprise Internet service providers (ISPs). In other embodiments, WAN 308 may comprise a multiple-protocol label switching network, a network of leased lines, or any other suitable network.

Each of internal network 240A and 240B may include an instance of an internal network 240 of FIG. 2, and thus, may include one or more endpoint devices of which network devices 244 and 246 are examples. In addition, each of firewall/gateway 220A and 220B may include an instance of a firewall/gateway 220 of FIG. 2, and thus, may implement or otherwise include an instance of a multi-access interface driver 118. Although FIG. 3 illustrates one possible topology for network 300 which is configured as a multi-interface (e.g., multi-ISP) VPN, network 300 may be implemented in other topologies, including those in which one or both of sites A and B include only a single interface 306A/306B, and/or including those in which a cluster of firewalls/gateways 220A/220B is used in lieu of a single firewall/gateway 220A/220B.

In operation, skilled practitioners in the art may recognize that the various components of network 300 may be used to implement secured multi-link communication between a single endpoint within internal network 240A and a single endpoint within internal network 240B, in that communication between the single endpoint of network 240A and the single endpoint of network 240B may be simultaneously routed over multiple links of wide area network 308 in order to provide communication with high availability and high bandwidth.

In operation, multi-access interface driver 118 may reduce or eliminate some or all of the known problems associated with enabling a large number of systems to communication directly using IPsec to protect traffic communicated between them. For example, as described in greater detail elsewhere in this disclosure, multi-access interface driver 118 may be configured to store a VPN topology in a route format, perform Level 2-type multicast delivery through a collection of Level 3 tunnels, and provide a multi-access interface as a VPN interface with dynamic peer resolving.

Storing VPN Topology in Route Format

Typically, IPsec configuration requires relatively large capacity of memory, as the collection of IPsec tunnel data structures comprises a large amount of information, especially when detailed traffic selectors must be storable in those data structures. As long as there is not yet traffic through a VPN, there is still the need of detecting which traffic must go to a VPN.

In accordance with embodiments of the present disclosure, multi-access interface driver 118 may store VPN topology, including information regarding IPsec tunnels, in the form of a routing table (e.g., which may be stored in multi-access interface cache 236, multi-access interface configuration settings 234, or in other suitable media). Practically all kinds of networking-enabled devices have efficient implementations for storing and processing information in the routing table. Accordingly, VPN topology may be maintained in security device 220's normal routing table, without duplicating the table inside the VPN module. Multi-access interface driver 118 may maintain such VPN topology in any suitable way, including manually configured routes or by way of dynamic routing protocol. Thus, a VPN component may utilize standard commands or system APIs to inject routes into such routing table format when the component has relevant topology information. In addition, if VPN is presented as a multi-access network interface, normal next hop gateway definitions may be used in the route format to define VPN topology. On the other hand, if VPN is presented as point-to-point tunnels or point-to-multipoint tunnels, such information may also be used in the route format to define VPN topology. In operation, actual VPN tunnel definitions may not be needed in active memory for tunnels that have no traffic, and such definitions may be fetched from another location (e.g., permanent storage media, another server in a network, etc.) when a tunnel is actively needed.

Level 2-Type Multicast Delivery Through Collection of Level 3 Tunnels

Multi-access interface driver 118 may, in a network comprising a collection of tunnels delivering only information associated with Level 3 of the OSI stack, implement multicast forwarding between such tunnels using multicast forwarding from Level 2 of the OSI stack. Those of skill in the art may recognize that multicast forwarding in Level 2 may depend on two factors: building a logical loop free topology for multicast forwarding, and forwarding multicast packets through that topology without verifying a time-to-live (TTL) value and forwarding non-routable multicast addresses.

In operation, instead of performing multicast routing between delivered Level 3 multicast messages, multi-access interface driver 118 may enable only forwarding between tunnels in the same virtual Level 2 network. Multi-access interface driver 118 may further limit multicast forwarding to VPN gateways willing to receive multicast.

In some embodiments, multi-access interface driver 118 may also build multicast group and/or sender-specific delivery trees. For example, when building logical loop free topology, the complexity of creating logical loop free topology may be reduced if multi-access interface driver 118 divides involved gateways into two groups for multicast delivery. Such division may be multicast-group specific.

In hub-and-spoke topologies, a multi-access interface driver 118 executing on a spoke gateway that is willing to send and/or receive multicast traffic may identify a connection to one of its hubs at a time as multicast-enabled, and may exchange multicast traffic only with such selected hub.

Between non-spoke multicast handlers, a multi-access interface driver 118 may use a more complex schema of building logical loop free topology. For example, to build a logical loop free topology, a multi-access interface driver 118 may adjust protocols familiar from Level 2 bridging of the OSI stack (e.g., spanning tree protocol, rapid spanning tree protocol, etc.) to operate at Level 3 of the OSI stack. As another example, a multi-access interface driver 118 may use Level 2 connectivity and perform forwarding between hub nodes of a hub-and-spoke topology.

As a further example, multi-access interface driver 118 may utilize full mesh connectivity among hub nodes, especially when the number of non-spoke nodes are reasonable and it is possible to have redundant connectivity (like multilink VPN). In accordance with such example, when multicast traffic is not received from another hub node (either traffic received from spoke node or multicast sent by hub itself), multi-access interface driver 118 may cause the traffic to be forwarded to all other identified spoke connections and to all hubs, and when traffic is received from another hub, multi-access interface driver 118 may cause the traffic to be forwarded only to all identified spoke connections.

With this multicast delivery model, it is not mandatory to know all other members in the same VPN topology. In addition, implementing this model does not require full mesh VPN topology, but can be applied also in other topologies. Further, in this model, there is no need to have all possible full mesh tunnel activated for multicasting.

Multi-Access Interface as VPN Interface with Dynamic Peer Resolving

Traditionally VPN is seen as point-to-point or point-to-multipoint interface (or not seen as network interface at all). Thus, particularly in large-scale dynamic VPN solutions, a multi-access interface may have many benefits. However, in the case of a large-scale dynamic VPN, it is not fair to expect that each VPN node has full and up-to-date knowledge of all other VPN nodes. Accordingly, use of this kind of VPN interface must be combined with some sort of dynamic peer-resolving schema. If a VPN topology has implemented multicasting support, multicasting can be used as such schema. This may be particularly suitable for Internet Protocol version 6 (IPv6), as neighbor discovery is performed in IPv6 using multicast. In the case of Internet Protocol version 4 (IPv4), IPv4 Address Resolution Protocol (ARP) queries can be converted by multi-access interface driver 118 to IPv4 or IPv6 multicast messages. For other messages (e.g., queries requesting endpoint addresses), multi-access interface driver 118 may issue multicast queries.

In a more security-oriented model in which it is not desired that each VPN node have multicasting enabled, multi-access interface driver 118 may implement a VPN broker. In such a scenario, some nodes in a VPN (e.g., VPN hubs if present) would act as brokers configured to deliver information regarding other members of the same VPN. In some embodiments, a node acting as a VPN broker may not be part of the actual VPN topology. In such embodiments, the protocol used to communicate with a broker node may be separate from VPN (e.g., Domain Name Service). In this VPN broker model, a node may require knowledge of at least one VPN broker in order to join a VPN. In some embodiments, authentication between a node and a VPN broker may be required (e.g., via IPsec, Internet Key Exchange, Hypertext Transfer Protocol Secure, etc.). During the connection between a node and a VPN broker, the node may provide information regarding the node (e.g., endpoint addresses, various VPN or networking settings, etc.), and the VPN broker may determine some information from the authenticated connection itself (e.g., a source address and port seen by the VPN broker when the node is connecting). In addition, the VPN broker may have information about allowed VPN members in its own database (e.g., allowed IP addresses stored in multi-access configuration settings).

After connection with the VPN broker, the VPN node may fetch information regarding the VPN (e.g., an up to date list of other brokers, a list of hub nodes, routes through the VPN). When the VPN node learns that it requires communication with another VPN node (e.g., an ARP discovery query, neighbor discovery query, a packet with a destination MAC, a packet to be routed through next hop gateway) and the address is not yet mapped to a known VPN peer node, the VPN node may query information regarding the peer node from the VPN broker. In the same way, a VPN node receiving a VPN negotiation attempt from an unknown VPN peer may contact a VPN broker and query for information about the other VPN peer. A VPN broker may respond to such queries by providing responsive information (e.g., endpoint addresses, information needed for authentication, information about acceptable IP addresses at the other end of tunnel), and based on this information, VPN peers can create direct VPN connections.

Further Optimization

The functionality described above with respect to storing VPN topology in a route format, Level 2-Type multicast delivery through a collection of Level 3 tunnels, and multi-access interface as VPN interface with dynamic peer resolving, may be implemented by multi-access interface driver 118. Multi-access interface driver 118 may be implemented in a module, which appears as a network interface driver to the rest of the networking stack.

When aiming for high performance, implementation can be further optimized. As an example, in some embodiments, an Ethernet frame may first be created and then a Media Access Control (MAC) address may be read from it and removed before sending to a tunnel. As another example, in some embodiments, an implementation can do without ARP or neighbor discovery, and tunnels can be bound directly to a next hop gateway definition in a routing table. In a further example, the methods described above may be implemented without any use of Level 2 addresses.

In addition, although the foregoing contemplates use of the methods and systems described in connection with IPsec, such methods and systems may also be used in other environments in which partial full mesh connections are used.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding this disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A computer-implemented method for providing a multi-access interface for network traffic, comprising:
   storing a routing table associated with the multi-access interface;
   implementing a virtual private network component;
   receiving, from the virtual private network component, information regarding topology of a virtual private network, wherein the information regarding the topology includes Internet Protocol Security (IPSec) tunnel information, and wherein the information is received via a standard routing table command and/or application programming interface (API);
   storing the topology in the routing table, wherein the topology is stored as routes according to a standard routing table format, and wherein the topology is stored only within the routing table and is not duplicated within the virtual private network component; and transmitting network traffic according to the topology stored in the routing table.

2. The computer-implemented method of claim 1, wherein storing the topology comprises storing, in the routing table, information regarding next hop gateway definitions.

3. The computer-implemented method of claim 1, wherein storing the topology comprises storing, in the routing table, information regarding point-to-point tunnels and/or point-to-multipoint tunnels that defines the topology.

4. A system comprising:
at least one processor; and
a non-transitory, computer-readable medium embodying instructions executable by the at least one processor for:
storing a routing table associated with the multi-access interface;
implementing a virtual private network component;
receiving, from the virtual private network component, information regarding topology of a virtual private network, wherein the information regarding the topology includes Internet Protocol Security (IPSec) tunnel information, and wherein the information is received via a standard routing table command and/or application programming interface (API);
storing the topology in the routing table, wherein the topology is stored as routes according to a standard routing table format, and wherein the topology is stored only within the routing table and is not duplicated within the virtual private network component; and
transmitting network traffic according to the topology stored in the routing table.

5. The system of claim 4, wherein storing the topology comprises storing, in the routing table, information regarding next hop gateway definitions.

6. The system of claim 4, wherein storing the topology comprises storing, in the routing table, information regarding point-to-point tunnels and/or point-to-multipoint tunnels that defines the topology.

7. A non-transitory, computer-readable medium embodying computer-executable instructions configured for:
storing a routing table associated with the multi-access interface;
implementing a virtual private network component;
receiving, from the virtual private network component, information regarding topology of a virtual private network, wherein the information regarding the topology includes Internet Protocol Security (IPSec) tunnel information, and wherein the information is received via a standard routing table command and/or application programming interface (API);
storing the topology in the routing table, wherein the topology is stored as routes according to a standard routing table format, and wherein the topology is stored only within the routing table and is not duplicated within the virtual private network component; and
transmitting network traffic according to the topology stored in the routing table.

8. The medium of claim 7, wherein storing the topology comprises storing, in the routing table, information regarding next hop gateway definitions.

9. The medium of claim 7, wherein storing the topology comprises storing, in the routing table, information regarding point-to-point tunnels and/or point-to-multipoint tunnels that defines the topology.

* * * * *